Patented June 1, 1954

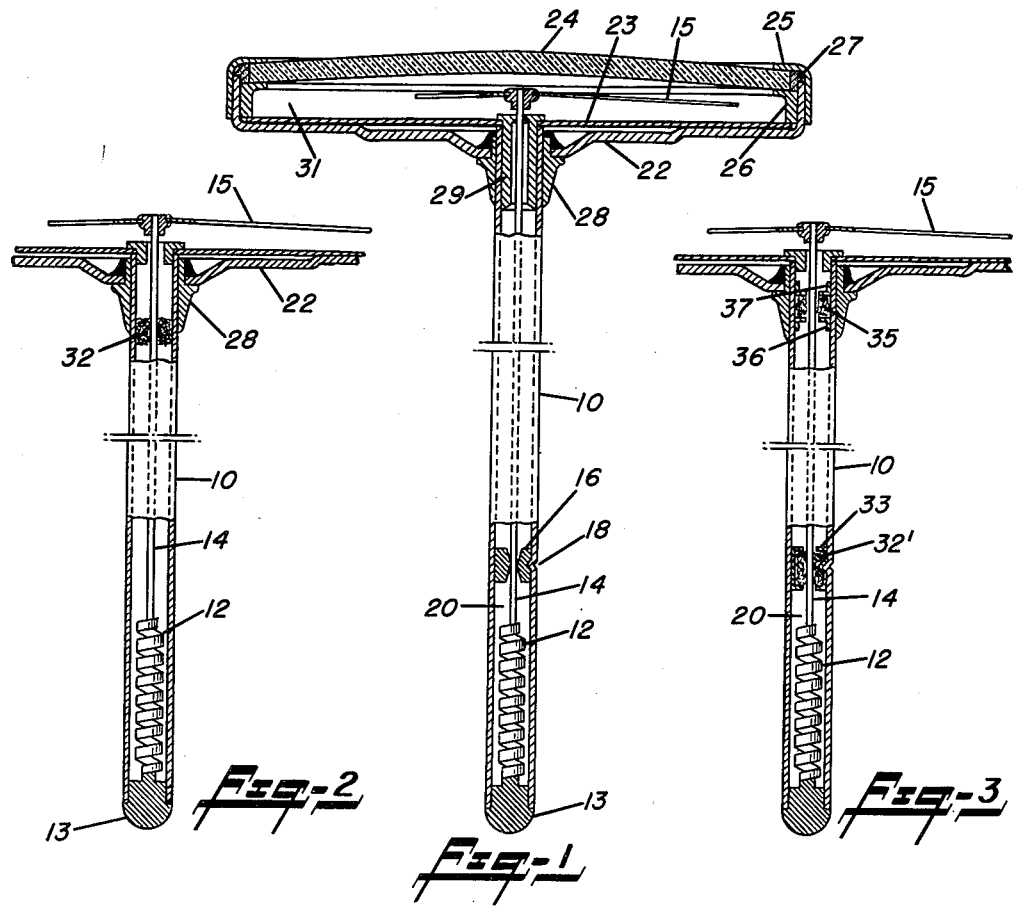
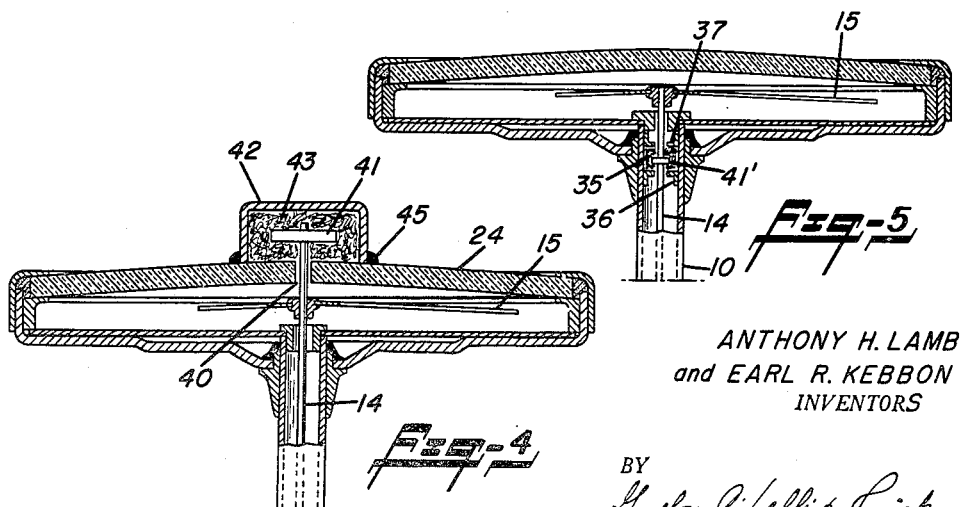
ANTHONY H. LAMB
and EARL R. KEBBON
INVENTORS

2,679,758

UNITED STATES PATENT OFFICE 2,679,758

THERMOMETER

Anthony H. Lamb, Hillside, and Earl R. Kebbon, Chatham, N. J., assignors to Weston Electrical Instrument Corporation, Newark, N. J., a corporation of New Jersey Application September 8, 1950, Serial No. 183,716

4 Claims. (Cl. 73—367)

This invention relates to bimetallic thermometers and more particularly to a precision thermometer in which the bimetallic element is protected from moisture and which is adapted for use under conditions of vibration.

The bimetallic element of a sensitive thermometer is usually a thin ribbon of bimetal wound in the form of a helical spring of one or more layers. In order to provide a thermometer having an acceptable speed of response and a substantial angular deflection of the pointer the helical element is, usually, rather long and delicate. Moisture within the thermometer casing has been a source of difficulty in thermometers designed for a wide range of temperature indications. The moisture in the air trapped within the thermometer casing would condense and collect on the bimetallic coil and eventually rust the material, thus destroying the original calibration of the instrument.

It has been proposed to overcome the problem of moisture effects upon the bimetallic coil by operating the coil in a chamber filled with a chemically inert liquid, one such arrangement being shown in U. S. Patent No. 2,365,487 issued December 19, 1944, to Royal H. Murray. One practical difficulty encountered in arrangements of this type is to provide a shaft packing which would prevent escape of the liquid (either due to inverting the instrument as a whole or to creepage of the liquid along the thermometer shaft) and which packing would not interfere with the movement of the thermometer shaft in response to the minute forces developed by the bimetallic coil.

Another problem peculiar to a bimetallic thermometer is that of pointer oscillation when the thermometer is mounted on vibrating apparatus such as mechanical motors, marine engines, etc. In such applications a certain amount of pointer damping is achieved by filling the bimetallic coil chamber with a suitable liquid but such construction is not entirely satisfactory for moderate or severe vibration use.

An object of this invention is the provision of a thermometer that includes a temperature-sensitive element protected from moisture and that is suitable for vibration use.

An object of this invention is the provision of a bimetallic thermometer in which the bimetallic element and the instrument scale are enclosed within different chambers of a sealed thermometer casing, said chambers being effectively blocked-off from each other by a viscous material.

An object of this invention is the provision of a bimetallic thermometer including a viscous material surrounding a portion of the thermometer staff, whereby normal rotation of the staff is unimpeded while abnormal vibration of the thermometer is not imparted to the indicating pointer.

An object of this invention is the provision of a bimetallic thermometer comprising a sealed casing that includes an operating element chamber in normal communication with an instrument scale chamber, a bimetallic element within the operating chamber for rotating a staff that extends into the instrument scale chamber and carries a pointer, a vibration-damping element disposed between the two chambers and surrounding a portion of the staff, the physical characteristics of the vibration-damping element being such that it prevents the transfer of air or fluid between the two chambers while at the same time permitting normal rotation of the shaft in response to temperature changes of the bimetallic element.

An object of this invention is the provision of a bimetallic thermometer comprising a sealed housing, a bimetallic element responsive to temperature changes, said element rotating a shaft that carries a pointer cooperating with a scale of temperature values, an extension of the shaft extending out of the sealed housing, a damping member carried by the shaft external of the housing, a retainer member removably disposed over the said pointer extension and damping member, and a viscous material contained within the said retainer member.

These and other objects and advantages will be apparent from the following description when taken with the accompanying drawings illustrating our invention. The drawings are for purposes of illustration and are not to be construed as defining the scope or limits of the invention, reference being had for this purpose to the appended claims.

In the drawings wherein like reference characters denote like parts in the several views:

Figure 1 is a longitudinal, cross-sectional view of a bimetallic thermometer of conventional construction;

Figure 2 is a fragmentary view, similar to Figure 1 and showing a bimetallic thermometer made in accordance with our invention;

Figure 3 is similar to Figure 2 and showing other embodiments of the invention;

Figure 4 is, likewise, a fragmentary, cross-sectional view showing the upper portion of a bimetallic thermometer incorporating our novel vibration-damping arrangement; and Figure 5 is a fragmentary, cross-sectional view of another embodiment of the invention.

Referring now to Figure 1, which illustrates a thermometer of conventional construction, the reference numeral 10 identifies the tubular stem or shell in which the thermally-responsive, bimetallic coil 12 is mounted. As shown, one end of the bimetallic coil is firmly secured to a plug 13 in any suitable manner, such as soldering, welding or the like, said plug being soldered or brazed to the shell to close the end thereof. The other end of the coil is similarly secured to a staff or shaft 14 carrying the indicating pointer 15 on the opposite end. A bushing 16, having a central hole clearing the shaft, is secured within the shell 10 and staked into position at several points, one such point being shown by the deformation 18. It can be seen, therefore, that the bimetallic coil functions within a chamber 20 that is sealed at all points except for the clearance hole in the bushing 16. The clearance hole is necessary to permit unobstructed rotation of the staff as the bimetallic coil generates only a relatively feeble force upon small changes in temperature.

A flat casing 22 is mounted on the tubular shell 10 and carries a scale plate 23, the casing having a cover glass 24 that is held in position by the ring 25. An annular spacing member 26 occupies the space between the cover glass and the scale plate so that all parts are held firmly in position by the ring 25 which may be cemented into place by a plastic or cement 27. The metal bushing 28 which is interposed between the casing 22 and the shell 10 is soldered or brazed to the casing at this point, and the shaft 14 is held in axial alignment within the shell by the bushing 29. Although not shown, it will be understood that the scale plate may carry suitable graduations of temperature units corresponding to the temperature range of the bimetallic coil of the particular thermometer assembly. In actual practice, the several metal parts of the instrument, except for the bimetallic coil, are preferably formed of stainless steel to avoid damage from moist air, gases or other liquids.

It will be apparent that in the conventional construction, just described with reference to Figure 1, there is a free exchange of air (through the clearance hole in the bushing 29 and the bushing 16), between the coil chamber 20 and the scale chamber 31. While the upper portion, or head, of the thermometer is sealed, such construction does not remain moisture-proof throughout the life of the instrument with the result that moisture-laden air often enters into the instrument. When this happens and the instrument is subjected to a reduced temperature the moisture condenses within the instrument and deterioration of the bimetallic coil takes place.

It has been the practice to fill the bimetallic-coil chamber 20 with a suitable liquid when the thermometer is designed for subjection to temperature variations of a wide range. Such liquid also serves several additional purposes, namely, to increase the speed of response of the temperature-sensitive coil to temperature changes at the outer surface of the shell, to reduce the possibility of damage to the coil when the instrument is subjected to mechanical shock, and to damp the movement of the coil in response to mechanical vibrations. While such features and characteristics are highly desirable in instruments of this type several practical considerations prevent the full realization of such advantages. Specifically, even though the clearance area in the various bushings, such as the bushings 16 and 29 shown in Figure 1, are made as small as possible without interfering with the rotation of the shaft, the liquid within the chamber 20 eventually creeps or flows into the upper scale chamber 31 resulting in a discoloration of the instrument scale plate. Also, such liquid does not damp, to any significant degree, the rotary motion of the staff and the pointer.

In accordance with this invention the bushing, or bushings, normally employed in a bimetallic thermometer may be dispensed with and in their place we provide a plug, or small mass, of a viscous substance that is in actual contact with the thermometer shaft and the adjacent wall of the tubular shell.

Referring now to Figure 2, a mass or plug 32, of a viscous substance such as a silicone grease, is inserted into the shell, as shown. It may here be pointed out that the viscous material has a relatively low coefficient of friction with the staff 14 and does not impede the normal rotation of the staff in response to temperature changes effecting the bimetallic coil 12. However, the substance has sufficient body, and is thick enough, to remain in position and to prevent the passage of gases, moisture or liquids into or out of the chamber 20 within which the bimetallic coil operates. We have found that one such barrier is sufficient to seal off effectively the coil chamber 20 from the scale chamber 31. It will be apparent this construction protects the bimetallic coil from moisture, prevents the escape of liquid from the chamber 20 when such liquid-filling is employed, and provides an effective seal when the chamber 20 is filled with a gas such as hydrogen, helium, etc., in thermometers requiring a high speed of response.

When desired, the viscous material may be retained in a retaining cup, or the like. As shown in Figure 3, the viscous mass 32' is contained in a cup 33 disposed within the thermometer shell, which cup is retained in position by staking, as shown. Alternatively, the cup 33 may be force-fitted within the shell. Another type of retainer is shown at the upper end of the thermometer. In this case the mass of viscous material 35 is retained between a pair of spaced washers 36, 37 that are frictionally disposed within the shell 10. In either case, the central hole in the retainer, either the cup or the washers, may be much larger than the diameter of the staff 14 as the viscous material is non-flowing.

It will now be apparent our simple construction provides a positive seal between the two chambers of the thermometer without in any way interfering with the normal operation of the instrument.

Figure 4 illustrates an arrangement for damping rotational motion of the instrument pointer when the thermometer is mounted on vibrating machinery or the like. In this case the shaft 14 of the thermometer extends through a hole 40 in the cover glass 24 and has secured thereto a disc 41 of metal, plastic or other material. An inverted cup 42 serves as a retainer for the mass 43 of the viscous material already described, such cup 42 being affixed to the glass as by the cement 45. The surface friction between the disc 41, which has a relatively large surface area, and the viscous material prevents rapid rotation of the disc and, consequently, the pointer 15 does not oscillate in response to vibration of the thermometer as a whole. We have found that a sensitive, bimetallic thermometer provided with a damping arrangement, as just described, provided steady pointer indications under conditions of severe vibration which rendered instruments of conventional constructions entirely useless. In addition to providing a steady pointer indication, which extends the range of use of bimetallic thermometers to vibrating machinery, our damping arrangement also prolongs the normal operating life of a thermometer as there is eliminated any nonfunctional movement of the parts.

Figure 5 illustrates a construction in which a single plug, or mass, of the viscous material serves the dual purpose of a moisture seal and vibration damper. In this construction the damping disc 41' is attached to the shaft 14 at a point between the pointer 15 and the bimetallic coil. Although Figure 5 illustrates the damping disc and viscous material at the upper end of the hollow shell 10, it will be apparent the disc may be positioned on the shaft so that it operates within the mass 32' of the viscous substance that is disposed within the cup 33 as shown in Figure 3.

Having now described our invention in accordance with the patent statutes, various modifications and changes in the parts and the arrangement thereof will suggest themselves to those skilled in this art. Such modifications and changes may be made without departing from the spirit and scope of the invention as set forth in the following claims.

We claim:

1. In a thermometer of the type comprising a tubular stem having a closed lower end and an upper end communicating with a scale chamber, a bimetallic coil disposed within the stem at the lower end said coil having one end secured in fixed position relative to the stem, a staff having a lower end secured to the other end of the coil and extending through the stem into the scale chamber, and a pointer carried by the upper end of the staff and cooperating with a scale plate secured within the scale chamber; an improved staff-bearing and staff-damping member comprising a plug of viscous material in intimate surface contact with the staff and the inner wall of the stem at a point proximate to the upper end of the stem.

2. The invention as recited in claim 1, wherein the plug of viscous material is a silicone grease.

3. The invention as recited in claim 2, wherein the plug of silicone grease is restrained against displacement axially of the stem by a pair of spaced, cup-shaped plates force-fitted into the stem and each having a central clearance hole accommodating the staff.

4. The invention as recited in claim 2 in combination with a flat disc secured to the staff and completely disposed within the plug of viscous material, said disc lying in a plain normal to the staff axis.

References Cited in the file of this patent

UNITED STATES PATENTS

| Number | Name | Date |
|---|---|---|
| 1,038,526 | Bristol | Sept. 17, 1912 |
| 2,117,287 | Bloch | May 17, 1938 |
| 2,167,083 | Nulsen et al. | July 25, 1939 |
| 2,343,372 | Ford et al. | Mar. 7, 1944 |
| 2,365,487 | Murray | Dec. 19, 1944 |
| 2,417,282 | Wheeler | Mar. 11, 1947 |
| 2,518,928 | Paine et al. | Aug. 15, 1950 |
| 2,569,311 | Hoare et al. | Sept. 25, 1951 |